United States Patent [19]

Bush et al.

[11] Patent Number: 4,496,524
[45] Date of Patent: Jan. 29, 1985

[54] PROCESS FOR THE REMOVAL OF SODIUM OXALATE COMPOUNDS FROM BAYER SPENT LIQUOR

[75] Inventors: J. Finley Bush, New Kensington; Paul J. The, Murrysville, both of Pa.

[73] Assignee: Aluminum Company of America, Pittsburgh, Pa.

[21] Appl. No.: 587,589

[22] Filed: Mar. 8, 1984

[51] Int. Cl.³ ............................ C01F 7/00; C01F 7/06
[52] U.S. Cl. .................................. 423/122; 423/121; 423/130
[58] Field of Search ................ 423/112, 121, 130, 122

[56] References Cited

U.S. PATENT DOCUMENTS

| | | | |
|---|---|---|---|
| 2,806,766 | 9/1957 | Anderson | 423/129 |
| 3,337,305 | 8/1967 | Byrns | 23/300 |
| 3,457,032 | 7/1969 | De La Breteque | 23/52 |
| 3,511,606 | 5/1970 | Halff et al. | 23/184 |
| 3,649,185 | 3/1972 | Sato et al. | 23/143 |
| 3,899,571 | 8/1975 | Yamada et al. | 423/127 |
| 4,275,042 | 6/1981 | Lever | 423/130 |
| 4,275,043 | 6/1981 | Gnyra | 423/130 |

FOREIGN PATENT DOCUMENTS 1123184  8/1968  United Kingdom ................ 423/122

Primary Examiner—Herbert T. Carter
Attorney, Agent, or Firm—Andrew Alexander; John P. Taylor

[57] ABSTRACT

A process is disclosed which provides for the removal of sodium oxalate compounds from a Bayer-type process liquor, after prior precipitation of aluminum hydroxide, which comprises: treating the liquor with ethanol in an amount up to 50 vol. % of the liquor to form a first layer comprising the ethanol and at least a portion of the caustic in the liquor, and a second layer comprising the liquor; and filtering at least the liquor layer to recover a sodium oxalate precipitate. Preferably, the liquor is concentrated to provide a caustic concentration of at least 200 and, most preferably, about 250 grams per liter total caustic (measured as sodium carbonate).

12 Claims, 4 Drawing Figures

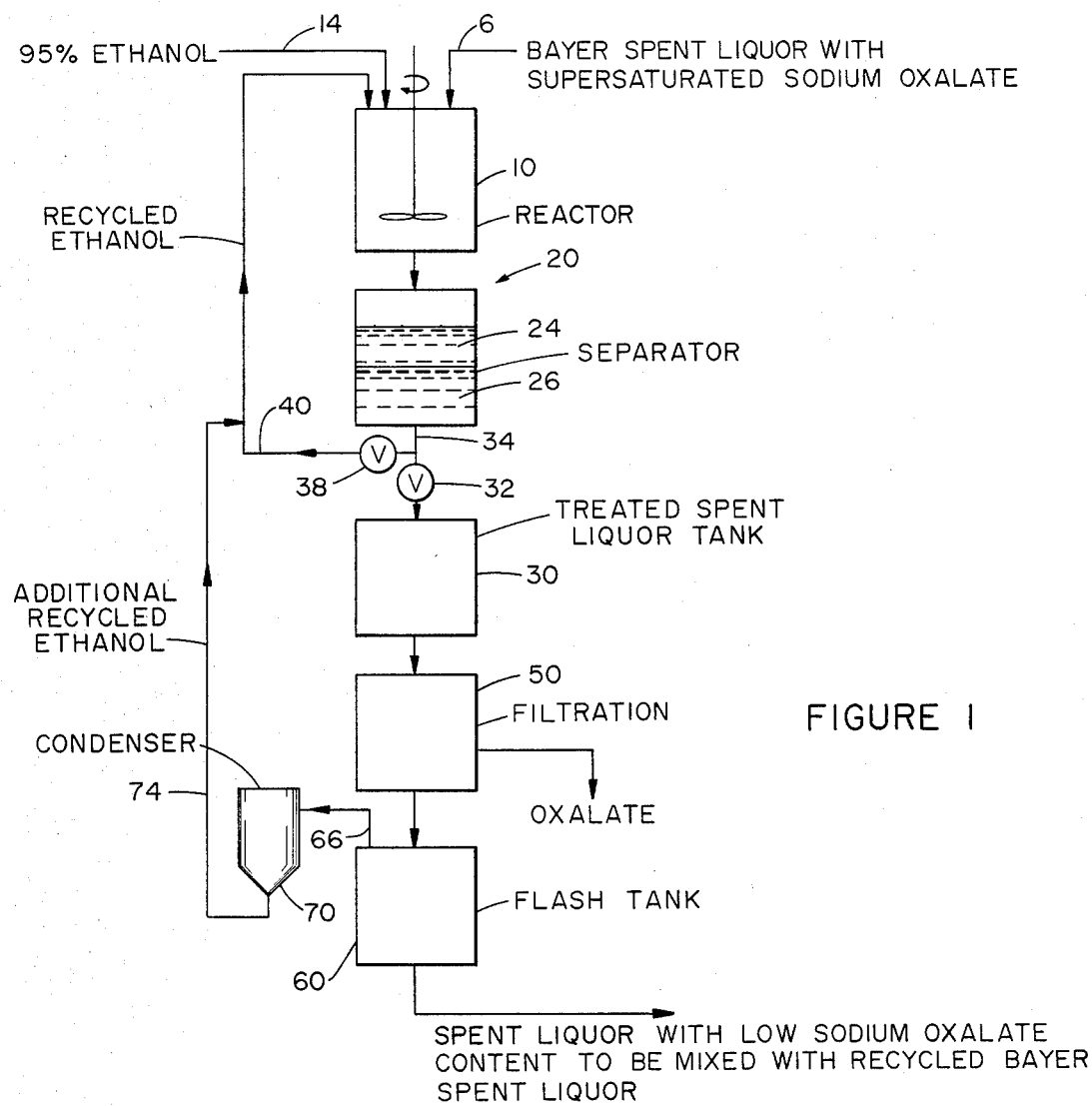
FIGURE 1
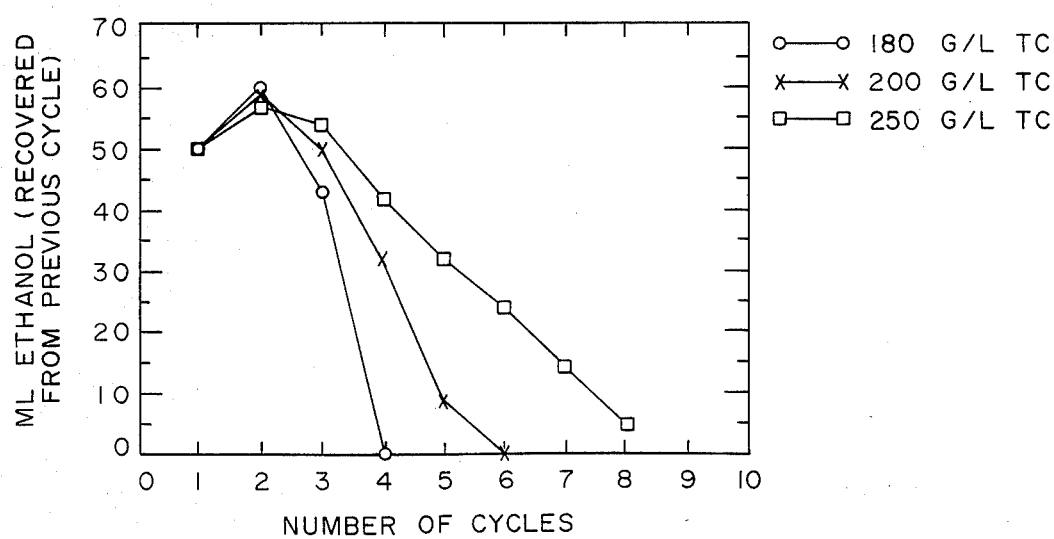
FIGURE 3 - OXALATE REMOVAL BY ALCOHOL EXTRACTION

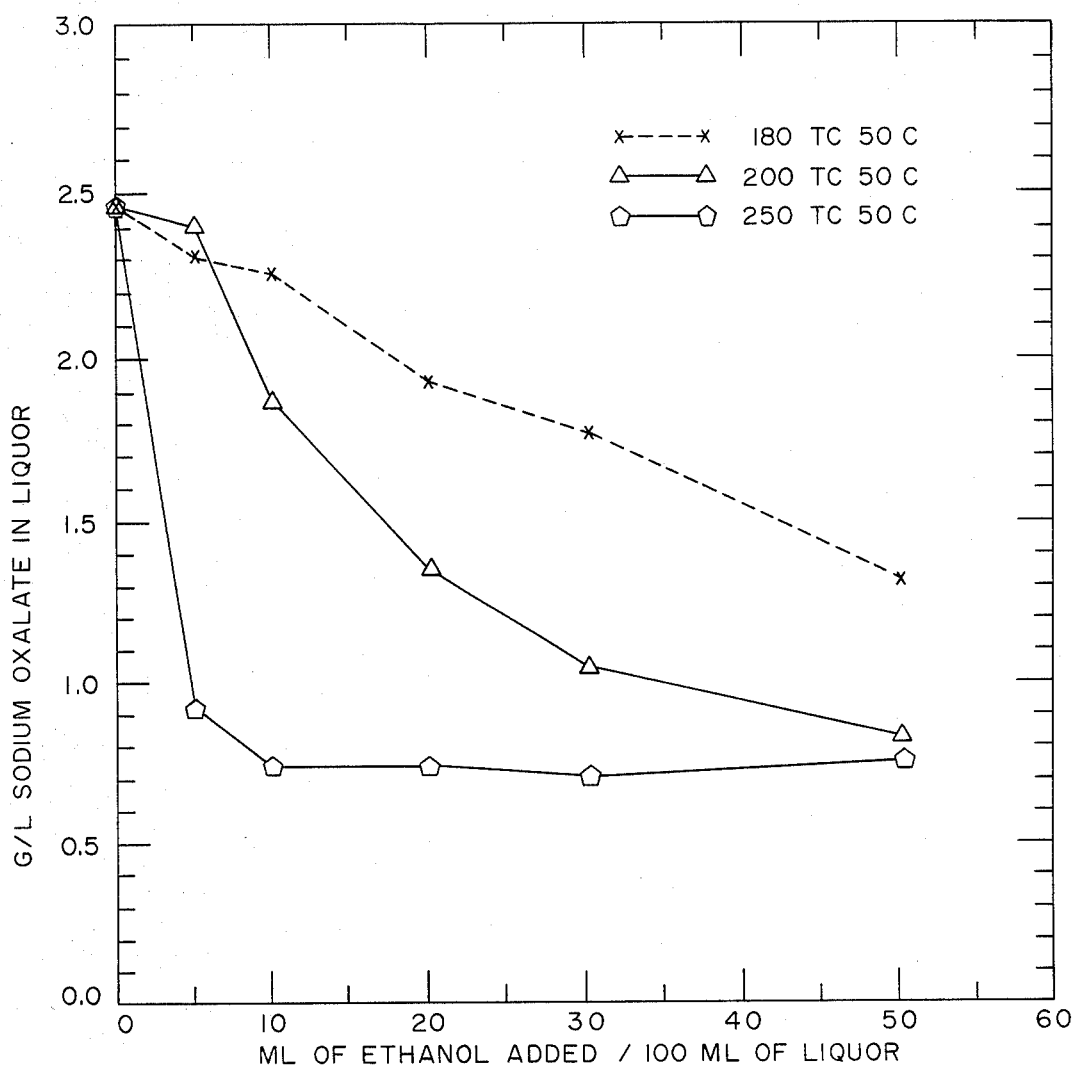
FIGURE 2 - OXALATE REMOVAL BY ETHANOL EXTRACTION
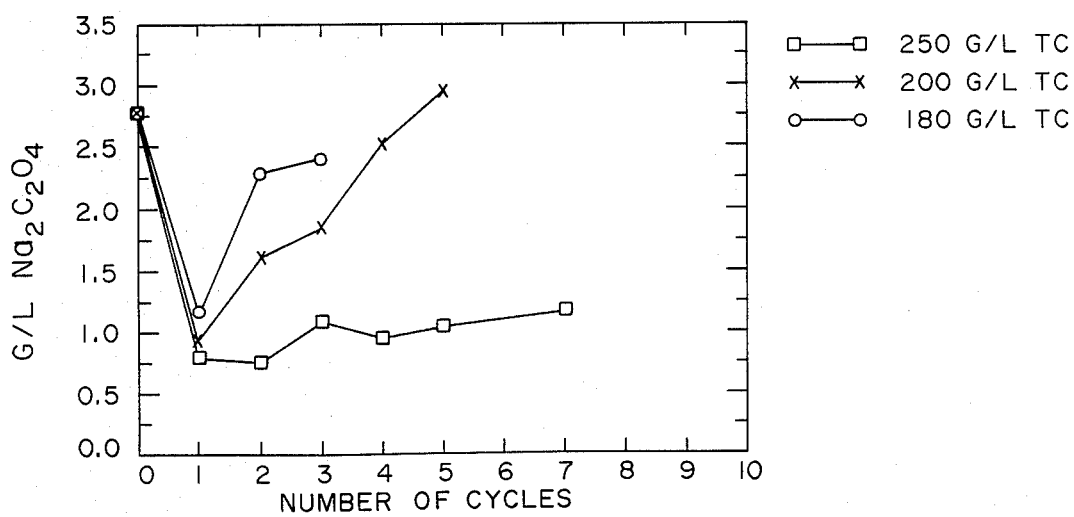
FIGURE 4 - OXALATE REMOVAL BY ALCOHOL EXTRACTION

PROCESS FOR THE REMOVAL OF SODIUM OXALATE COMPOUNDS FROM BAYER SPENT LIQUOR

BACKGROUND OF THE INVENTION

1. Field of the Invention

This invention relates to production of alumina from bauxite or other aluminum-containing ores. More particularly, this invention relates to the removal of sodium oxalate compounds from Bayer-type spent liquor.

2. Brief Description of the Prior Art

Aluminum-bearing ores, such as bauxite, used in the production of aluminum hydroxide, contain organic materials which are a composite of many substances described by such terms as humic, lignin, cellulose and protein. In caustic digestion processing, commonly known as Bayer processing, a portion of this organic matter is extracted into the liquor during digestion and is decomposed to form soluble sodium organic compounds. One of these degradation products has been identified as sodium oxalate. With recycling (for economic reasons) of the liquor after precipitation of aluminum hydroxide, the sodium oxalate concentration increases until an equilibrium concentration is reached.

Although it is known that pure sodium oxalate in the usual concentration of Bayer spent liquor, i.e., 180 grams/liter total caustic (TC), has little effect on the precipitation of aluminum hydroxide, plant oxalate, that is, oxalate which accumulates in the ore refining process and which is defined to include degraded organic materials, has been blamed for inhibiting precipitation of aluminum hydroxide. When this plant sodium oxalate concentration builds up to a critical supersaturated concentration, then it coprecipitates with the aluminum hydroxide giving rise to aluminum hydroxide fines and interfering with agglomeration of the aluminum hydroxide fines in the precipitation process. This causes serious problems in separating the fine aluminum hydroxide crystals from the mother liquor, resulting in more fine aluminum hydroxide being recycled back to digestion thereby decreasing the overall aluminum hydroxide yield. In order to obtain aluminum hydroxide product, having large particles formed, at least in part, by means of agglomeration, it is necessary to remove at least a portion of the sodium oxalate from the liquor stream. This reduces the accumulation of sodium oxalate and depresses its coprecipitation with aluminum hydroxide crystals in solution.

Several methods have been proposed to reduce the sodium oxalate concentration in caustic liquor. Byrns U.S. Pat. No. 3,337,305 proposes addition of ammonia to a caustic liquor containing oxalates to cause a precipitation of sodium oxalate salts. Yamada et al U.S. Pat. No. 3,899,571 provides for the removal of sodium oxalate by the addition of sodium oxalate seed crystals to a spent liquor to precipitate organic substances, mainly composed of sodium oxalate, which are then removed from the spent liquor.

Breteque U.S. Pat. No. 3,457,032 discloses a process for the purification of sodium aluminate obtained by alkaline digestion of bauxite which comprises treating the solution with strongly basic anion exchange resins of a macroreticular type to eliminate metal ion and organic acid impurities. Lever U.S. Pat. No. 4,275,042 describes the removal of sodium oxalate from Bayer spent liquor by treating the liquor with a cationic sequestrant which interacts with the humic material in the spent liquor to remove it and thereby destabilize the solution with respect to precipitation of sodium oxalate. The patentees also used seed crystals to expedite the precipitation of the sodium oxalate after the removal of the humic material. Gnyra U.S. Pat. No. 4,275,043 describes the removal of oxalate, generally as a disodium salt, from Bayer process liquor by treating the liquor with an adsorbent, such as activated carbon, to remove sufficient of the humic matter in the liquor to destabilize the sodium oxalate and cause it to precipitate.

Sato et al U.S. Pat. No. 3,649,185 describes a process for the removal of sodium oxalate from a spent liquor by increasing the caustic concentration of the liquor as well as controlling the temperature to develop supersaturation. The patentees further point out that the crystallized sodium oxalate is contained mainly in the finer part of the crystals and that this is used for further separation of the sodium oxalate.

While each of these methods has met with some limited success, there still remains a need for an economical method of removing sodium oxalate while minimizing excess process steps and alumina losses.

SUMMARY OF THE INVENTION

Quite surprisingly, it was found, during the course of investigation of the extraction of caustic values from spent liquor using an ethanol extraction fluid, that the sodium oxalate solubility in a Bayer-type spent liquor can be lowered by treatment with ethanol.

It is, therefore, an object of the invention to provide an improved process for the removal of sodium oxalate from a Bayer-type process liquor for the production of aluminum hydroxide.

It is another object of the invention to provide an improved process for the removal of sodium oxalate from a Bayer-type process liquor for the production of aluminum hydroxide by treating the liquor, after precipitation of the aluminum hydroxide, with ethanol to precipitate sodium oxalate compounds.

These and other objects of the invention will be apparent from the attached description and accompanying drawings.

In accordance with the invention, a process is provided for the removal of sodium oxalate compounds from a Bayer-type process liquor, after prior precipitation of aluminum hydroxide, which comprises: treating the liquor with ethanol in an amount up to 50% by volume of the liquor to form a first layer comprising the ethanol and at least a portion of the caustic in the liquor, and a second layer comprising the liquor; and filtering at least the liquor layer to recover a sodium oxalate precipitate. Preferably, the liquor is concentrated to provide a caustic concentration of at least 200 and, most preferably, about 250 grams per liter total caustic (measured as sodium carbonate).

DESCRIPTION OF THE DRAWINGS

FIG. 1 is a flow sheet illustrating the process of the invention.

FIG. 2 is a graph plotting oxalate extraction against ethanol used at three total caustic concentrations.

FIG. 3 is a graph showing the amount of ethanol recovered from the prior cycle of ethanol extraction as a function of the number of previous cycles for various total caustic concentrations.

FIG. 4 is a graph showing the amount of oxalate removed at each cycle of ethanol extraction at various total caustic concentrations.

DESCRIPTION OF THE INVENTION

The invention provides a process for the removal of sodium oxalate compounds from a Bayer-type process liquor after prior precipitation of aluminum hydroxide.

The term Bayer-type process liquor is intended to define the liquor which results from the caustic digestion of an aluminum-bearing ore, such as bauxite with a caustic agent, such as sodium hydroxide, wherein the aluminum in the ore forms a soluble sodium aluminate solution. The remaining, insoluble, portion of the ore is then separated from the liquor, and aluminum hydroxide is precipitated from the liquor after first seeding the liquor with fine aluminum hydroxide seed crystals. For purposes of process economics, the remaining spent liquor is then recycled back for reuse in the digestion process.

In this type of process, however, certain organic impurities in the ore also enter into solution in the liquor and tend to accumulate when the liquor is repeatedly recycled back to the digestion process. Certain of the organic materials comprise oxalates, or at least result in a formation of oxalates, which can interfere with the agglomeration of the finer aluminum hydroxide crystals during precipitation. It is such organic impurities, referred to herein as sodium oxalate compounds, which are removed from the spent liquor in accordance with the process of the invention.

Referring now to FIG. 1, a stream 6 of Bayer spent liquor (that is, Bayer-type process liquor previously subjected to a precipitation to remove a majority of the aluminum hydroxide values therein) containing sodium oxalate compounds is blended with ethanol in a stirred reactor 10. The ethanol may comprise fresh makeup ethanol from stream 14 or recycled ethanol from line 40, as will be described below.

The ethanol used may be substantially pure or have up to 10 vol. % of denaturing ingredients, such as methanol, benzene or the like, or inorganic denaturing agents. Preferably, the ethanol comprises a commercial grade 95 vol. % ethyl alcohol.

The amount of ethanol used, by volume percent, should not exceed 50% of the spent liquor volume and may be as low as 5%. If higher than 50% is used, the amount of caustic extracted from the spent liquor may lower the caustic/alumina ratio in the spent liquor sufficiently to cause precipitation of aluminum hydroxide with the oxalate compounds. This will either cause loss of alumina values or necessitate a further separation of the alumina from the oxalate. Preferably, the amount of ethanol used is 10 to 50 vol. % and most preferably 30 to 50 vol. %. The higher percentage by volume of ethanol used is found to lower the solubility of the oxalate in the aqueous spent liquor phase causing a higher precipitation of the oxalate compounds. FIG. 2 illustrates the effectiveness of the oxalate removal at three different concentrations of caustic plotted against the volume of ethanol used.

After the spent liquor and ethanol have been thoroughly mixed, the liquid mixture is passed into a separator 20 in which the mixture is allowed to separate into two layers. Top layer 24 comprises a majority of the ethanol together with some of the caustic liquor which is extracted from the spent liquor. Bottom layer 26 comprises mainly the spent liquor as well as a minor amount of ethanol which equilibrates (i.e., is absorbed) into the aqueous or spent liquor phase. This separation decreases the oxalates solubility in the aqueous phase causing a portion of the oxalate to precipitate. Following the separation, the lower phase containing both the spent liquor and the oxalate precipitate is passed into holding tank 30 by opening valve 32 in line 34 which interconnects separator 20 with holding tank 30. After the bottom layer 26 has been drained from separator 20, valve 32 is closed and a second valve 38, on a branch line 40, which interconnects with line 34 above valve 32, is opened; and the top layer 24, which comprises most of the ethanol, is recycled back, via line 40, to stirred reactor 10 for further reaction with spent liquor.

The spent liquor/oxalate precipitate slurry is passed from holding tank 30 into a filtration stage 50 where the oxalate precipitate is filtered out and removed. The remaining spent liquor is then passed into a flash tank 60 where any alcohol in the spent liquor is flashed off and passed via line 66 to condenser 70. The alcohol vapors are condensed in condenser 70 and passed via line 74 to branch line 40 wherein they merge with the ethanol from top layer 24 for recycling back to reactor 10 for use in extraction of further Bayer spent liquor.

The concentration of the spent liquor may vary from 180 to as high as 250 grams per liter total caustic (TC) expressed as sodium carbonate equivalent with a preferred concentration being at least 200 grams per liter. Concentrations of around 250 grams per liter have been found to be more effective in removing sodium oxalate. It will be understood that amounts greater than 250 grams per liter are not presently known to adversely affect the process. While normal Bayer-type spent liquor usually has a nominal concentration of 180 grams/liter TC, the higher concentration of liquor has been found to result in a higher amount of precipitation of sodium oxalate. Furthermore, it has been found that when higher amounts of ethanol are used, i.e., up to 50 vol. %, with higher concentrations of caustic up to 250 grams per liter, relatively less ethanol equilibrates in the aqueous phase so that more ethanol can be recovered and reused for up to seven cycles. In FIG. 3, there is shown the number of milliliters of ethanol recovered from the previous cycle per 100 milliliters initially used at three different concentrations. As seen in FIG. 3, at a lower caustic concentration of 180 grams per liter total caustic, less ethanol volume, can be recovered to be reused for the successive treatments. Furthermore, the recycled ethanol has been found to be not as effective in removing the oxalate from the liquor stream for reasons which are not entirely understood, possibly due to the dilution of ethanol with water from the aqueous phase.

To illustrate the process of the invention, various amounts of 95% ethanol ranging from 5 vol. % to 50 vol. % were added to spent liquor having nominal total caustic (TC) concentrations of 180, 200 and 250 grams per liter (measured as sodium carbonate). The more concentrated TC solutions were made by concentrating aliquots of normal 180 grams/liter TC Bayer spent liquor. The results are shown in Table I where it will be seen that the higher volume percent ethanol added to a higher concentration of total caustic results in the most effective removal of oxalate from the spent liquor. The amounts of sodium oxalate, listed as remaining after the extraction, are corrected to reflect the amount in a 180 grams/liter TC concentration to enable more meaningful comparison of the data.

TABLE I

| Sample Number | 95% Ethanol Added ml/100 ml liq. | Temp. °C. | Liquor Analysis, g/l | | | | |
|---|---|---|---|---|---|---|---|
| | | | Total Caustic Nominal | Total Caustic Actual | Total Alkali | Alumina | Sodium Oxalate |
| Control | | 50 | 180 | 177.0 | 236.4 | 70.4 | 2.46 |
| 1 | 5 | 50 | 180 | 171.7 | 234.2 | 69.4 | 2.31 |
| 2 | 10 | 50 | 180 | 164.3 | 224.7 | 66.6 | 2.26 |
| 3 | 20 | 50 | 180 | 162.2 | 221.6 | 66.3 | 1.93 |
| 4 | 30 | 50 | 180 | 167.5 | 232.2 | 70.9 | 1.77 |
| 5 | 50 | 50 | 180 | 182.9 | 256.0 | 80.2 | 1.32 |
| 6 | 5 | 50 | 200 | 196.1 | 267.1 | 79.6 | 2.40* |
| 7 | 10 | 50 | 200 | 188.2 | 257.1 | 77.2 | 1.87* |
| 8 | 20 | 50 | 200 | 189.7 | 261.8 | 79.1 | 1.35* |
| 9 | 30 | 50 | 200 | 204.1 | 275.9 | 84.7 | 1.05* |
| 10 | 50 | 50 | 200 | 214.7 | 292.7 | 91.7 | 0.83* |
| 11 | 5 | 50 | 250 | 242.8 | 330.7 | 99.2 | 0.92* |
| 12 | 10 | 50 | 250 | 254.5 | 338.8 | 99.0 | 0.74* |
| 13 | 20 | 50 | 250 | 249.5 | 336.8 | 102.4 | 0.74* |
| 14 | 30 | 50 | 250 | 253.4 | 342.2 | 104.8 | 0.71* |
| 15 | 50 | 50 | 250 | 253.8 | 343.3 | 106.9 | 0.76* |

*Sodium Oxalate concentration corrected to reflect amount in 100 ml of 180 grams/liter TC liquor prior to concentration.

As stated previously, the ethanol is recycled back to react with further spent liquor. However, it has been found that the recycled ethanol loses its effectiveness after about five to seven recyclings, apparently due to dilution with water from the aqueous phase. After seven cycles, the ethanol should be further processed to remove the caustic which may then be recycled back with the purified spent liquor to the ore digestion stage (i.e., the Bayer processing plant). The ethanol may be purified by flash evaporation of the ethanol followed by condensing. The caustic residue would then be recycled back to digestion. FIG. 4 shows the amount of oxalates removed at the various liquor concentrations for each cycle of reuse of the ethanol.

The top layer 24, which contains principally the ethanol and caustic liquor extracted therewith, may also contain a minor amount of oxalate precipitate. If this occurs to any major extent, the precipitate may be filtered out prior to recycling of the ethanol back to stirred reactor 10 for further extraction of the spent liquor.

Thus, the invention provides an improved method for removal of undesirable organic impurities, such as oxalates, from the ore digestion and alumina precipitation cycle which will avoid buildup of such impurities due to recycling of the spent liquor back to the digestor.

Having thus described the invention, what is claimed is:

1. A process for the purification of Bayer spent liquor from a Bayer-type caustic digestion process to remove organic impurities therein which comprises:
   (a) treating said spent liquor with up to 50 vol. % ethanol to precipitate said organic impurities without precipitating substantially any alumina values and to form two layers comprising, respectively, ethanol in an upper layer, and spent liquor and said organic precipitate in a lower layer;
   (b) separating the lower spent liquor layer containing said organic impurities from said upper ethanol layer;
   (c) filtering said spent liquor layer to remove said precipitated organic impurities; and
   (d) returning said filtered liquor to said Bayer-type caustic digestion process.

2. The process of claim 1 wherein said spent liquor is concentrated to at least 200 grams/liter total caustic prior to said treatment with ethanol to increase the amount of organic impurities precipitated.

3. The process of claim 1 wherein said liquor is concentrated to at least 250 grams per liter total caustic prior to said treatment.

4. The process of claim 1 wherein any ethanol remaining in said filtered liquor layer prior to recycling said filtered liquor is removed from said filtered liquor and said removed ethanol from said lower liquor layer is recycled back to treat a further portion of said Bayer-type process liquor.

5. The process of claim 4 wherein said ethanol in said liquor is removed from said filtered liquor by flash evaporation.

6. The process of claim 5 wherein said ethanol flash evaporated from said filtered liquor layer is condensed and blended with ethanol from said upper layer prior to said recycling.

7. The process of claim 1 wherein said ethanol used in said treatment process is recovered after separation from said lower liquor layer for further processing of spent liquor.

8. The process of claim 7 wherein any oxalate precipitation in said upper ethanol layer is removed prior to recycling of said ethanol.

9. The process of claim 7 wherein said ethanol in said upper layer separated from said lower liquor layer is recycled up to 7 times without further purification of said ethanol.

10. The process of claim 7 wherein any caustic liquor present in said upper ethanol layer is removed from said ethanol prior to recycling said ethanol.

11. The process of claim 10 wherein said caustic liquor is recycled back to said ore digestion stage.

12. The process of claim 10 wherein said ethanol is processed to separate said caustic liquor from said upper ethanol layer by evaporation of said ethanol followed by condensation of said separated ethanol prior to said recycling.

* * * * *